United States Patent
Martindale et al.

(10) Patent No.: US 9,738,395 B2
(45) Date of Patent: Aug. 22, 2017

(54) LIQUID STORAGE SYSTEM

(71) Applicant: BAE Systems plc, London (GB)

(72) Inventors: Nicholas John Martindale, South Gloucestershire (GB); Nicholas Park, South Gloucestershire (GB); Simon Anthony Jenkins, South Gloucestershire (GB); Andrew James Irwin, Lancashire (GB); Christopher Steven Bingham, Lancashire (GB); Chrisostomos Angelis Constantinou, South Gloucestershire (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 15/308,405

(22) PCT Filed: May 6, 2015

(86) PCT No.: PCT/GB2015/051325
§ 371 (c)(1),
(2) Date: Nov. 2, 2016

(87) PCT Pub. No.: WO2015/170092
PCT Pub. Date: Nov. 12, 2015

(65) Prior Publication Data
US 2017/0081039 A1    Mar. 23, 2017

(30) Foreign Application Priority Data

May 7, 2014  (EP) ...................................... 14275105
May 7, 2014  (GB) .................................. 1408018.8

(51) Int. Cl.
*B64D 37/08*    (2006.01)
*B60K 15/03*    (2006.01)
(Continued)

(52) U.S. Cl.
CPC .............. *B64D 37/32* (2013.01); *B60K 15/03* (2013.01); *B64D 37/06* (2013.01); *B64D 37/08* (2013.01);
(Continued)

(58) Field of Classification Search
CPC ........................... B65C 3/34; B64D 2037/325
(Continued)

(56) References Cited

U.S. PATENT DOCUMENTS 2,354,701 A * 8/1944 Pescara ................. B64D 37/06
                                                          109/81
2,519,393 A   8/1950 Noyes
(Continued)

FOREIGN PATENT DOCUMENTS

DE      19749950 A1    5/1999
DE      10218144 A1   11/2003
(Continued)

OTHER PUBLICATIONS

International Preliminary Report on Patentability for application No. PCT/GB2015/051325, dated Nov. 8, 2016, 8 pages.
(Continued)

*Primary Examiner* — J. Gregory Pickett
*Assistant Examiner* — Allan Stevens
(74) *Attorney, Agent, or Firm* — Maine Cernota & Rardin (57) ABSTRACT

Disclosed is a liquid storage system having an outer tank (e.g. an aircraft fuel tank) for containing a liquid (e.g. aircraft fuel), the outer tank enclosing a liquid storage space; an inner tank located within the outer tank and enclosing the liquid storage space; and at least one coupling element associated with the outer tank and the inner tank for maintaining the tanks in a spaced apart relationship; wherein the coupling element(s) is/are deformable such that, on appli-
(Continued)

cation of a force to the inner tank, at least part of the inner tank moves relative to the outer tank.

15 Claims, 3 Drawing Sheets

(51) Int. Cl.
  *B64D 37/32* (2006.01)
  *B64D 37/06* (2006.01)
  *F41H 5/007* (2006.01)
  *B64D 37/04* (2006.01)
  *B64C 3/34* (2006.01)

(52) U.S. Cl.
  CPC .... *F41H 5/007* (2013.01); *B60K 2015/03407* (2013.01); *B60Y 2200/51* (2013.01); *B64D 2037/325* (2013.01)

(58) Field of Classification Search
  USPC ......... 220/560.01, 560.07, 560.11, 562, 563, 220/564, 567.2
  See application file for complete search history.

(56) References Cited

U.S. PATENT DOCUMENTS

| | | | |
|---|---|---|---|
| 2,754,992 | A | 7/1956 | Wilson |
| 3,004,509 | A * | 10/1961 | Leroux ............... B63B 25/14 114/74 A |
| 3,616,189 | A | 10/1971 | Harr |
| 3,969,563 | A | 7/1976 | Hollis |
| 4,336,291 | A | 6/1982 | Broadhurst |
| 4,360,124 | A | 11/1982 | Knaus |
| 4,469,295 | A | 9/1984 | Schuster |
| 4,828,206 | A | 5/1989 | Bruno |
| 4,886,225 | A | 12/1989 | Bates |
| 5,195,650 | A | 3/1993 | Leidig |
| 5,451,015 | A | 9/1995 | Cronkhite |
| 5,674,586 | A | 10/1997 | Toni |
| 5,738,925 | A | 4/1998 | Chaput |
| 6,220,287 | B1 | 4/2001 | Wolf |
| 7,861,884 | B2 * | 1/2011 | Childress ............... B60K 15/03 220/4.15 |
| 8,096,223 | B1 | 1/2012 | Andrews |
| 9,266,619 | B2 * | 2/2016 | Childress ............... B23P 11/00 |
| 2002/0047015 | A1 * | 4/2002 | Distelhoff ........ B60K 15/03177 220/562 |
| 2005/0085146 | A1 | 4/2005 | Farkas |
| 2006/0174417 | A1 | 8/2006 | Elrod |
| 2007/0017359 | A1 | 1/2007 | Gamache |
| 2009/0090236 | A1 | 4/2009 | Misencik |
| 2009/0152278 | A1 | 6/2009 | Lindner |
| 2009/0236163 | A1 | 9/2009 | Wibbeke et al. |
| 2011/0017748 | A1 | 1/2011 | Palma |
| 2011/0094598 | A1 | 4/2011 | Childress et al. |
| 2012/0055937 | A1 | 3/2012 | Monk |
| 2012/0181288 | A1 | 7/2012 | Childress |
| 2012/0266745 | A1 | 10/2012 | Warren |
| 2013/0082062 | A1 | 4/2013 | Kawamotoi et al. |
| 2015/0102040 | A1 * | 4/2015 | Bornes ............... B64D 37/04 220/562 |

FOREIGN PATENT DOCUMENTS

| | | |
|---|---|---|
| DE | 202013103931 U | 9/2013 |
| EP | 0056289 A1 | 7/1982 |
| EP | 124205 A1 | 7/1984 |
| EP | 0299503 A2 | 1/1989 |
| EP | 0689991 B1 | 2/1999 |
| EP | 1147934 A1 | 10/2001 |
| EP | 2048079 A2 | 4/2009 |
| FR | 493293 A | 8/1919 |
| FR | 2101483 A5 | 3/1972 |
| FR | 2264566 A1 * | 10/1975 ............... A62C 3/06 |
| FR | 3011822 A1 | 4/2015 |
| GB | 191217292 A | 11/1912 |
| GB | 367579 A | 2/1932 |
| GB | 565121 A | 10/1944 |
| GB | 0567936 A | 3/1945 |
| GB | 585517 A | 2/1947 |
| GB | 685440 A | 1/1953 |
| GB | 1231675 A | 5/1971 |
| GB | 1510860 A | 5/1978 |
| GB | 2054456 A | 2/1981 |
| GB | 2054457 A | 2/1981 |
| GB | 2088806 A | 6/1982 |
| GB | 2155873 A | 10/1985 |
| GB | 2198099 A | 6/1988 |
| GB | 2275455 A | 8/1994 |
| JP | 2007237776 A | 9/2007 |
| WO | 9639335 A1 | 12/1996 |
| WO | 0034121 A1 | 6/2000 |
| WO | 2012101439 A1 | 8/2012 |
| WO | 2012173594 A1 | 12/2012 |

OTHER PUBLICATIONS

Characteristics of Kyocera Technical Ceramics, Jun. 30, 2004, XP055149244, Retrieved Oct. 28, 2014 from url: http://americas.kyocera.com/kicc/pdf/kyocera_Material_Characteristics.pdf.
Great Britain Combination Exam and Search Report of Application No. GB1507725.8, dated Nov. 3, 2015, 6 pages.
Great Britain Search Report of Application No. GB1408013.9, dated Nov. 19, 2014, 4 pages.
Extended European Search Report of Application No. EP14275102, dated Oct. 28, 2014, 9 pages.
International Search Report and Written Opinion of Applcation No. PCT/GB2015/051322, dated Jul. 2, 2015, 14 pages.
Extended European Search Report of Application No. EP14275103, dated Nov. 5, 2014, 9 pages.
Great Britain Search Report of Application GB1408015.4, dated Oct. 29, 2014, 3 pages.
Great Britain Combined Search and Exam Report of Application No. GB1507727.4, dated Oct. 29, 2015, 7 pages.
International Preliminary Report on Patentability of Application No. PCT/GB2015/051324, dated Apr. 8, 2016, 16 pages.
International Search Report and Written Opinion of Application No. PCT/GB2015/051324, dated Jul. 6, 2015, 12 pages.
International Preliminary Report on Patentability PCT/GB2015/051327, dated Apr. 21, 2016, 18 pages.
Great Britain Search Report of application GB1408020.4 dated Oct. 30, 2014, 3 pages.
Great Britain Search and Examination Report of application GB1507732.4 dated Oct. 22, 2015, 8 pages.
European Search Report for application 14275107.2 dated Nov. 10, 2014, 10 pages.
International Search Report for application PCT/GB2015/051327 dated Jul. 2, 2015, 10 pages.
European Search Report for application 14275104.9 dated Nov. 5, 2014, 9 pages.
Great Britain Search Report for application 1408016.2 dated Oct. 29, 2014, 3 pages.
Great Britain Search and Examination Report of application GB1507724.1 dated Oct. 27, 2015, 7 pages.
International Preliminary Report on Patentability for application PCT/GB2015/051321 dated Apr. 25, 2016, 18 pages.
International Search Report for application PCT/GB2015/051321 dated Jul. 7, 2015, 12 pages.
European Search Report for application 14275105.6 dated Nov. 2, 2014, 8 pages.
Great Britain Search Report for application 1408018.8 dated Oct. 30, 2014, 3 pages.
Great Britain Search and Examination Report for application 1507731.6 dated Oct. 29, 2015, 6 pages.

(56) References Cited

OTHER PUBLICATIONS

International Search Report for application PCT/GB2015/051325 dated Jul. 6, 2015, 11 pages.

\* cited by examiner

LIQUID STORAGE SYSTEM

RELATED APPLICATIONS

This application is a national phase application filed under 35 USC §371 of PCT Application No. PCT/GB2015/051325 with an International filing date of May 6, 2015, which claims priority of GB Patent Application GB 1408018.8 filed May 7, 2014 and EP Patent Application EP14275105.6 filed May 7, 2014. Each of these applications is herein incorporated by reference in its entirety for all purposes.

FIELD OF THE INVENTION

The present invention relates to liquid storage systems.

BACKGROUND

A high speed projectile on impact with and penetration into a liquid containing tank generates very high pressure in the liquid. This phenomenon, known as hydrodynamic ram, typically includes the generation of shock waves and subsequent pressure pulses in the liquid. These pressures, combined with the penetration damage from the projectile, can cause damage to the tank structure and frequently are the cause of catastrophic failure of the tank. The hydrodynamic ram pressure pulses are intense but of short duration which propagate through the liquid in the tank.

There is thus a need for means for reducing hydrodynamic ram pressure in the liquid in such a tank and for a generally improved tank which has an improved ability to sustain projectile impact without catastrophic failure.

SUMMARY OF THE INVENTION

In a first aspect, the present invention provides a liquid storage system comprising: an outer tank for containing a liquid, said outer tank enclosing a liquid storage space; an inner tank located within the outer tank and enclosing the liquid storage space; and spacing means associated with the outer tank and the inner tank for maintaining said tanks in a spaced apart relationship. The spacing means are deformable such that, on application of a force to the inner tank, at least part of the inner tank moves relative to the outer tank. The inner tank comprises: a first portion comprising a first base wall and first side walls extending from the first base wall, the first side walls surrounding a first opening opposite to the first base wall; and a second portion comprising a second base wall and second side walls extending from the second base wall, the second side walls surrounding a second opening opposite to the second base wall. The first portion and the second portion are coupled to the outer tank by respective deformable spacing means such that the first and second portions may move independently from each other.

The second portion may be located within the first portion such that the second opening is located at or proximate to the first base wall and such that the first opening is located at or proximate to the second base wall.

The inner tank may conform substantially to the shape of the outer tank. The spacing means may maintain the tanks in a spaced apart parallel relationship so as to form an annular space between the tanks.

The spacing means may be elastic such that, if the inner tank moves relative to the outer tank, the inner tank is returned to its original position with respect to the outer tank.

The inner tank may be made of one or more materials selected from the group of materials consisting of: carbon fibre composite material, aluminium, plastic, and a material comprising aramid or para-aramid fibres.

The walls of the inner tank may be rigid.

One or more walls of the inner tank may comprise a first wall and a second wall.

The first and second walls of the inner tank may be spaced apart to define therebetween at least one chamber. The first and second walls of the inner tank may be sufficiently strong to resist at least the maximum and minimum hydrostatic pressures of a liquid in the liquid storage system. The at least one chamber may have a volume sufficient to allow a shock wave or waves in the liquid in the liquid storage system resulting from compression of the liquid by impact of a projectile on the liquid storage system to be reduced by expansion of the compressed liquid into the chamber.

The inner tank may be made of a permeable or semi-permeable material such that a liquid stored in the liquid storage system may flow through walls of the inner tank.

The inner tank may comprise one or more holes or perforations for allowing the flow of a liquid stored in the liquid storage system therethrough.

The total cavity volume of the inner tank and the spacing means in the outer tank may be less than or equal to 15% by volume of the outer tank volume.

The outer tank may be an aircraft fuel tank.

In a further aspect, the present invention provides a vehicle comprising a liquid storage system for containing a liquid, the liquid storage system being in accordance with any of the above aspects. The vehicle may be an aircraft and the outer tank may be an aircraft fuel tank. The outer tank may be formed, at least in part, by an external skin of the aircraft.

In a further aspect, the present invention provides a method of providing a liquid storage system. The method comprises: providing an outer tank for containing a liquid, said outer tank enclosing a liquid storage space; positioning an inner tank within the outer tank, the inner tank enclosing the liquid storage space; and positioning spacing means between the outer tank and the inner tank so as to maintain said tanks in a spaced apart relationship. The spacing means are deformable such that, on application of a force to the inner tank, at least part of the inner tank moves relative to the outer tank; the inner tank comprises: a first portion comprising a first base wall and first side walls extending from the first base wall, the first side walls surrounding a first opening opposite to the first base wall; and a second portion comprising a second base wall and second side walls extending from the second base wall, the second side walls surrounding a second opening opposite to the second base wall. The first portion and the second portion are coupled to the outer tank by respective deformable spacing means such that the first and second portions may move independently from each other.

In a further aspect, the present invention provides a liquid storage system comprising: an outer tank for containing a liquid, said outer tank enclosing a liquid storage space; an inner tank located within the outer tank and enclosing the liquid storage space; spacing means associated with the outer tank and the inner tank for maintaining said tanks in a spaced apart relationship; wherein the spacing means are deformable such that, on application of a force to the inner tank, at least part of the inner tank moves relative to the outer tank.

The inner tank may conform substantially to the shape of the outer tank. The spacing means may maintain the tanks in a spaced apart parallel relationship so as to form an annular space between the tanks.

The spacing means may be elastic such that, if the inner tank moves relative to the outer tank, the inner tank is returned to its original position with respect to the outer tank.

The inner tank may be made of one or more materials selected from the group of materials consisting of: carbon fibre composite material, aluminium, plastic, and a material comprising aramid or para-aramid fibres.

The inner tank may comprise: a first portion comprising a first base wall and first side walls extending from the first base wall, the first side walls surrounding a first opening opposite to the first base wall; and a second portion comprising a second base wall and second side walls extending from the second base wall, the second side walls surrounding a second opening opposite to the second base wall. The second portion may be located within the first portion such that the second opening is located at or proximate to the first base wall and such that the first opening is located at or proximate to the second base wall. The first portion and the second portion may be coupled to the outer tank by respective deformable spacing means such that the first and second portions may move independently from each other.

Walls of the inner tank may be rigid. Walls of the outer tank may be rigid.

One or more walls of the inner tank may comprise a first wall and a second wall, the first and second walls of the inner tank being spaced apart to define therebetween at least one chamber. The first and second walls of the inner tank may be sufficiently strong to resist at least the maximum and minimum hydrostatic pressures of a liquid in the tank. The at least one chamber may have a volume sufficient to allow a shock wave or waves in the liquid in the tank resulting from compression of the liquid by impact of a projectile on the liquid storage system to be reduced by expansion of the compressed liquid into the chamber.

The inner tank may be made of a permeable or semi-permeable material such that a liquid stored in the liquid storage system may flow through walls of the inner tank.

The walls of the inner tank may comprise one or more holes or perforations for allowing the flow of a liquid stored in the liquid storage system therethrough.

The total cavity volume of the inner tank and the spacing means in the outer tank may be less than or equal to 15% by volume of the outer tank volume.

The outer tank may be an aircraft fuel tank (e.g. located in the wing of an aircraft).

In a further aspect, the present invention provides a vehicle comprising a liquid storage system for containing a liquid, the liquid storage system being in accordance with any of the above aspects.

The vehicle may be an aircraft. The outer tank may be an aircraft fuel tank. The outer tank may be formed, at least in part, by an external skin of the aircraft.

In a further aspect, the present invention provides a method of providing a liquid storage system, the method comprising: providing an outer tank for containing a liquid, said outer tank enclosing a liquid storage space; positioning an inner tank within the outer tank, the inner tank enclosing the liquid storage space; and positioning spacing means between the outer tank and the inner tank so as to maintain said tanks in a spaced apart relationship. The spacing means are deformable such that, on application of a force to the inner tank, at least part of the inner tank moves relative to the outer tank.

DETAILED DESCRIPTION

In the following description, like reference numerals refer to like elements.

The following description is based on embodiments of the invention and should not be taken as limiting the invention with regard to alternative embodiments that are not explicitly described herein. Structural material types and methods of construction identified are examples only.

It will be appreciated that relative terms such as top and bottom, upper and lower, and so on, are used merely for ease of reference to the Figures, and these terms are not limiting as such, and any two differing directions or positions and so on may be implemented.

Figure 1:
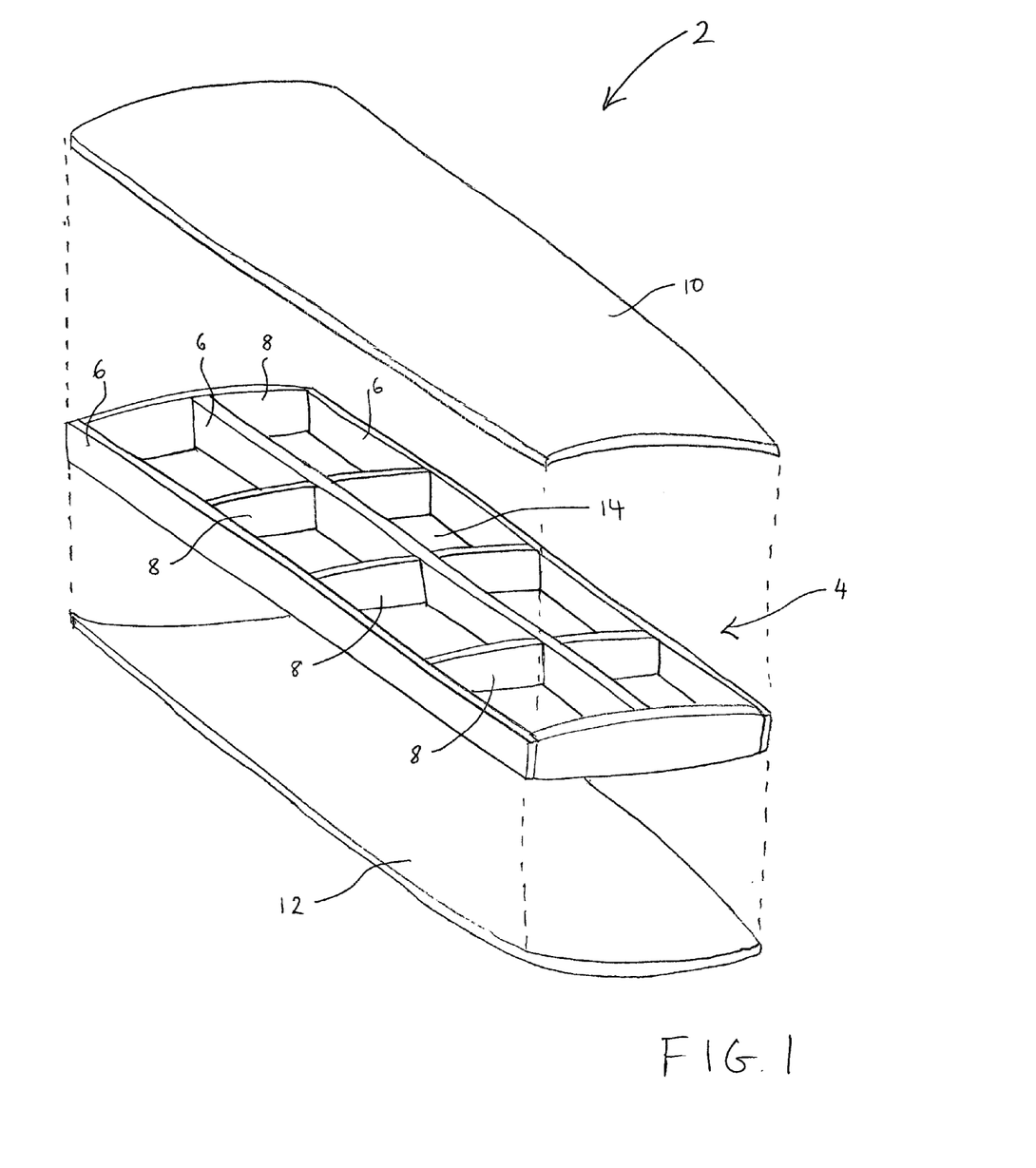
FIG. 1 is a schematic illustration (not to scale) of an exploded view of an example aircraft wing in which an embodiment of a assembly is implemented.

FIG. 1 is a schematic illustration (not to scale) of an exploded view of an example aircraft wing 2 in which an embodiment of a hydrodynamic ram reducing assembly is implemented.

The aircraft wing 2 comprises a substructure 4 comprising a plurality of spars 6 and ribs 8. The spars 6 are spaced apart from one another and are aligned along the length of the aircraft wing 2. The spars 6 are coupled together by the spaced apart ribs 8 which are substantially perpendicular to the spars 6. The spars 6 and ribs 8 are connected together by fasteners (not shown in the Figures). The spars 6 and ribs 8 are made of carbon fibre composite (CFC) material, i.e. a composite material comprising a polymer matrix reinforced with carbon fibres. In other examples, the spars 6 and ribs 8 are made of a different appropriate material, for example, aluminium.

The aircraft wing 2 further comprises external skins, namely an upper skin 10 and a lower skin 12. The upper skin 10 comprises a plurality of panels made of CFC material. The upper skin 10 is attached to an upper surface of the substructure 4 by fasteners (not shown in the Figures). The lower skin 12 comprises a plurality of panels made of CFC material. The lower skin 12 is attached to a lower surface of the substructure 4 by fasteners (not shown in the Figures). The external skin 10, 12 may each be, for example, 8 mm thick.

When the substructure 4 and the external skins 10, 12 are attached together (and, for example, bonded with a sealant), a cavity defined by the substructure 4 and skins 10, 12 is formed. Such a cavity is used as a fuel tank for storing aircraft fuel and is indicated in FIG. 1 by the reference numeral 14. The fuel tank is described in more detail later below with reference to FIG. 2.

The aircraft wing 2 further comprises a leading edge structure, a trailing edge structure and a wing tip structure, which are not shown in FIG. 1 for reasons of clarity.

Figure 2:
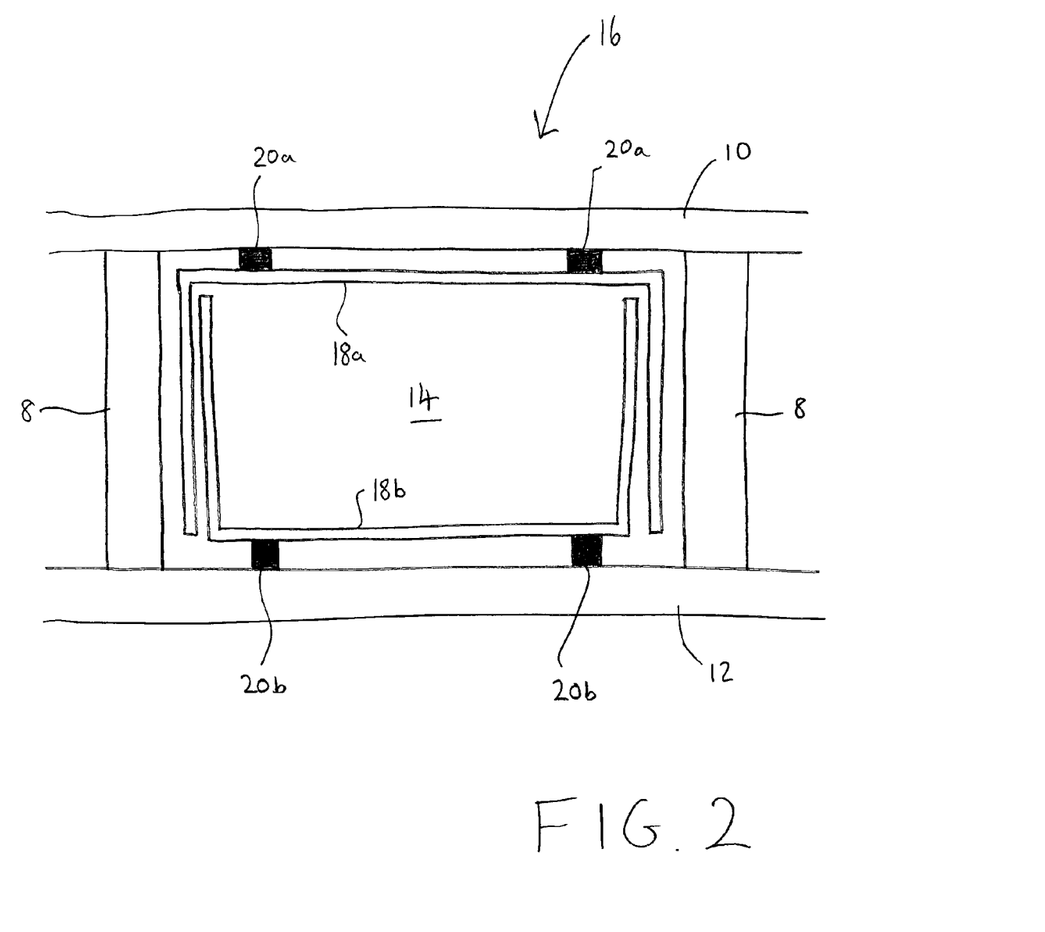
FIG. 2 is a schematic illustration (not to scale) showing a cross section through a fuel tank in which an embodiment of a hydrodynamic ram reducing assembly is implemented.

FIG. 2 is a schematic illustration (not to scale) showing a cross section through the fuel tank 16 in the aircraft wing 2.

In this embodiment, the outer walls of the fuel tank 16 are provided by spars 6, ribs 8, and the upper and lower skins 10, 12. Aircraft fuel is stored in the cavity 14 defined by the fuel tank outer walls.

In this embodiment, the fuel tank 16 comprises a hydrodynamic ram reducing assembly comprising a first inner tank wall 18a, a second inner tank wall 18b, a first plurality of coupling elements 20a, and a second plurality of coupling elements 20b.

The first inner tank wall 18a is located within the cavity 14. The first inner tank wall 18a comprises a base wall that is substantially parallel with the upper skin 10 and is coupled to, and spaced apart from, the upper skin 10 by the first plurality of coupling elements 20a. The first inner tank wall 18a further comprises side walls that extend from the edges of the base wall of the first inner tank wall 18a and are substantially parallel to, and spaced part from, the ribs 8. The first inner tank wall 18a further comprises further side walls (not shown in FIG. 2) that extend from the edges of the base wall of the first inner tank wall 18a and are substantially parallel to, and spaced part from, the spars 6. The first inner tank 18a comprises an opening opposite the base wall of the first inner tank wall 18a, the opening of the first inner tank wall 18a being proximate to the lower skin 12.

The second inner tank wall 18b is located within the cavity 14. The second inner tank wall 18b is located within the first inner tank wall 18a. The second inner tank wall 18b comprises a base wall that is located within the opening of the first inner tank wall 18a. The base wall of the second inner tank wall 18b is substantially parallel with the lower skin 12 and is coupled to, and spaced apart from, the lower skin 12 by the second plurality of coupling elements 20b. The second inner tank wall 18b further comprises side walls that extend from the edges of the base wall of the second inner tank wall 18b and are substantially parallel to, and spaced part from, the ribs 8. The side walls of the second inner tank wall 18b are located within the first inner tank wall 18a and are substantially parallel with the side walls of the first inner tank 18a. The second inner tank wall 18b further comprises further side walls (not shown in FIG. 2) that extend from the edges of the base wall of the second inner tank wall 18b and are substantially parallel to, and spaced part from, the spars 6. The further side walls of the second inner tank wall 18b are located within the first inner tank wall 18a and are substantially parallel with the further side walls of the first inner tank wall 18a. The second inner tank wall 18b comprises an opening opposite the base wall of the second inner tank wall 18b, the opening of the second inner tank wall 18b being proximate to the base wall of the first inner tank wall 18a and the upper skin 10.

In this embodiment, the first and second inner tank walls 18a, 18b are substantially rigid, i.e. is resistant to flexing or deforming.

In this embodiment the first and second inner tank walls 18a, 18b are made of the same material from which the spars 6 and ribs 8 are made, i.e. CFC. In other embodiments, one or both of the first and second inner tank walls 18a, 18b are made of one or more different materials instead of or in addition to CFC, for example, aluminium aluminum, plastic, or an aramid or para-aramid synthetic fibre-based material such as poly-paraphenylene terephthalamide (which is more commonly known as KEVLAR® or TWARON®, or UHM-WPE fibres (e.g. SPECTRA®, DYNEEMA®).

In this embodiment, the inner tank walls 18a, 18b have thicknesses less than or equal to those of the aircraft skins 10, 12. In some embodiments, the inner tank walls 18a, 18b are between 2 mm and 5 mm thick.

In this embodiment, the inner tank walls 18a, 18b are sufficiently permeable to allow the fluid within the fuel tank 16 (i.e. aircraft fuel) to flow through those walls 18a, 18b. In some embodiments, the inner tank walls 18a, 18b may comprise a plurality of small holes, perforations, or cut-outs so as to permit the flow of a liquid therethrough. Such holes or perforations may have diameters of between 10 mm and 30 mm. Thus, flow of the fluid into, within, and out of (e.g. to the aircraft engine) the fuel tank 16 tends not to be detrimentally affected by the presence of the hydrodynamic ram reducing assembly within the fuel tank 16. In some embodiments, the inner tank walls 18a, 18b may be made of a permeable or semi-permeable material.

In this embodiment, the coupling elements 20a, 20b space apart the outer tank walls (i.e. the skin 10, 12, spars 6 and ribs 8) from the inner tank walls 18a, 18b.

Preferably, the coupling elements 20a, 20b are deformable such that, as described in more detail later below with reference to FIG. 3, under application of a force or forces to the inner tank walls 18a, 18b, the coupling elements 20a, 20b permit movement of the inner tank walls 18a, 18b with respect to the outer tank walls. For example, the coupling elements 20a, 20b may be made of crushable foam that is configured to compress upon application of a compressive force.

More preferably, the coupling elements 20a, 20b are elastically deformable such that, as described in more detail later below with reference to FIG. 3, under application of a force or forces to the inner tank walls 18a, 18b, the coupling elements 20a, 20b permit movement of the inner tank walls 18a, 18b with respect to the outer tank walls and then act so as to move the inner tank walls 18a, 18b back to their original positions with respect to each other and the outer tank walls. For example, the coupling elements 20a, 20b may be made of damped resilient springs.

In this embodiment, the inner tank walls 18a, 18b may move independently from one another.

Preferably, the size of the components of the hydrodynamic ram reducing assembly is such that the assembly occupies less than 15% of the total internal volume (i.e. capacity) of the fuel tank 16. In other embodiments, the assembly occupies a different proportion of the fuel tank capacity.

As will now be described in more detail, the hydrodynamic ram reducing assembly is operable to reduce hydrodynamic ram pressure in the fuel contained within the fuel tank 16 resulting from impact of a projectile with an external surface of the fuel tank 16.

Figure 3:
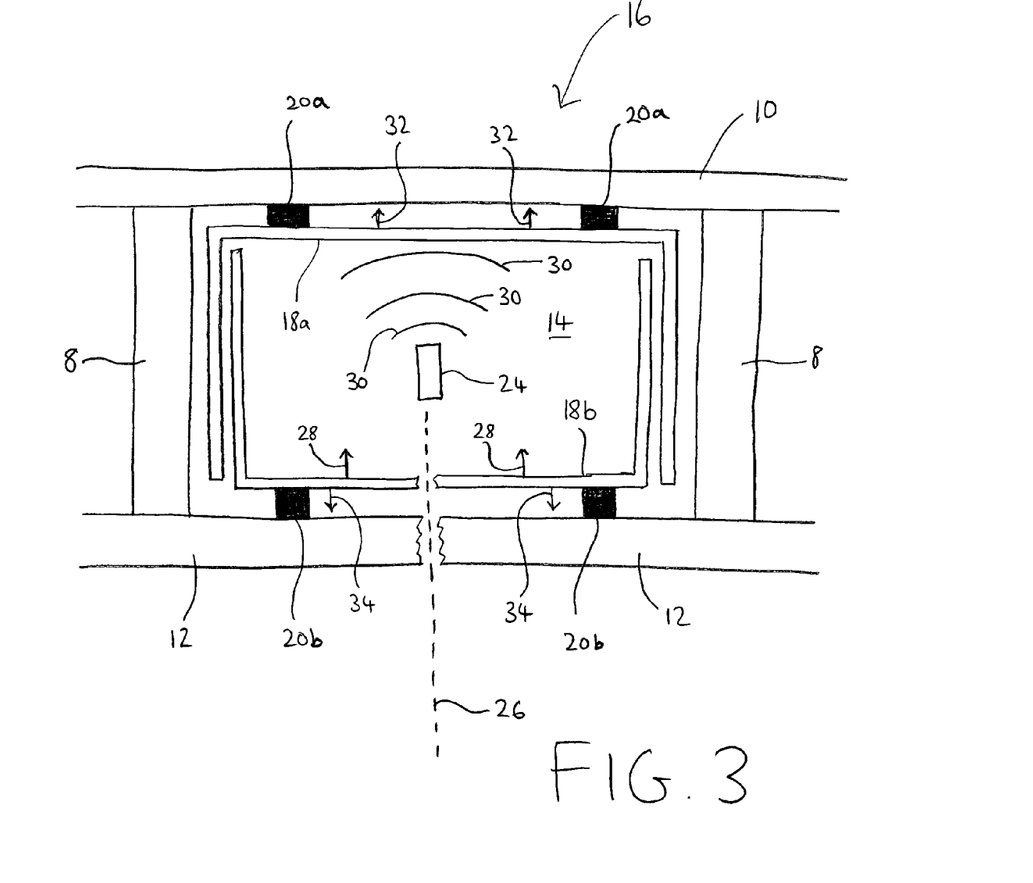
FIG. 3 is a schematic illustration (not to scale) illustrating effects of a projectile impacting with an external surface of the fuel tank of FIG. 2.

FIG. 3 is a schematic illustration (not to scale) illustrating effects of a projectile 24 impacting with the lower skin 12 of the fuel tank 16. The path of the projectile 24 through the lower skin 12 is indicated in FIG. 3 by the reference numeral 26.

The projectile 24 may be any appropriate projectile or foreign object such as a bullet, warhead fragment, a vehicle part, a rock, a maintenance tool, hail, ice, a bolt, etc. An example projectile has a weight of approximately 3.5 g, is substantially spherical in shape having a diameter of approximately 9.5 mm, and travels with a velocity of 1500 m/s. A further example projectile is a 44 g 12.5 mm bullet that travels with a velocity of 500 m/s.

In this example, the projectile 24 initially impacts with an external surface of the lower skin 12 and travels through the lower skin 12. The projectile 24 causes high strain rate shear damage to the lower skin 12 resulting in a hole in the lower skin 12 approximately the size of the projectile 24.

In this example, after passing through the lower skin 12, the projectile 24 impacts with the base wall of the second inner tank wall 18b. The second inner tank wall 18b tends to be deflected and accelerated at least to some extent (e.g. in the direction indicated in FIG. 3 by solid arrows and the reference numerals 28) by the impacting projectile 24. The projectile 24 impacting with the second inner tank wall 18b tends to retard the passage of the projectile 24 into the fuel tank 16. Furthermore, impact kinetic energy of the projectile 24 tends to be used to deflect and accelerate the second inner tank wall 18b through the fluid in the fuel tank 16, thereby reducing the energy introduced into the fluid directly by the projectile 24. This movement of the second inner tank wall 18b through the fluid is permitted by the second plurality of coupling elements 20b being deformable. Advantageously, in embodiments in which the second coupling elements 20b are elastic, the second inner tank wall 18b is returned to its original position within the fuel tank 16. This returning of the second inner tank wall 18b to its original position uses energy absorbed from the impacting projectile 24. Thus, elastic coupling elements 20b tend to more gradually dissipate the energy of the projectile 24 into the fluid within the fuel tank 16.

In this example, the projectile 24 travels through the second inner tank wall 18b. The projectile 24 causes high strain rate shear damage to the second inner tank wall 18b resulting in a hole in the second inner tank wall 18b approximately the size of the projectile 24. Impact kinetic energy of the projectile 24 tends to be used to penetrate the second inner tank wall 18b, thereby reducing the energy introduced into the fluid directly by the projectile 24. In some examples, the projectile 24 does not fully penetrate the second inner tank wall 18b and the projectile 24 is prevented from travelling further into the fuel tank 16, thereby reducing the energy of shockwaves and/or a cavitation pressure caused by the projectile 24.

In this example, after travelling through the second inner tank wall 18b, the projectile 24 impacts with the fluid within the inner tank (which is defined by the inner tank walls 18a, 18b). The impacting projectile 24 tends to generate one or more high pressure shock waves 30 within the fluid in the fuel tank 16. These shock waves 30 tend to be of lower energy than a shock wave or shock waves experienced in a conventional system due to at least some of the impact energy of the projectile 24 being absorbed by the second inner tank wall 18b.

In this example, the shock waves 30 generated by the projectile 24 impinge on the first inner tank wall 18a. The first inner tank wall 18a tends to be deflected and accelerated at least to some extent (e.g. in the direction indicated in FIG. 3 by solid arrows and the reference numerals 32) by the incident shockwaves 30. Energy of the shockwaves 30 tends to be used to deflect and accelerate the first inner tank wall 18a through the fluid in the fuel tank 16, thereby reducing the shockwave energy transferred to at least the upper skin 10. This movement of the first inner tank wall 18a through the fluid is permitted by the first plurality of coupling elements 20a being deformable. Advantageously, in embodiments in which the first coupling elements 20a are elastic, the first inner tank wall 18a is returned to its original position within the fuel tank 16. This returning of the first inner tank wall 18a to its original position uses energy absorbed from the shockwaves 30. Thus, elastic coupling elements 20a tend to more gradually dissipate the shockwave energy into the fluid within the fuel tank 16.

Furthermore, the first inner tank wall 18a may reflect incident shock waves 30 at least to some extent. Also, the first inner tank wall 18a tends to be a relatively poor transmitter of impinging shock waves 30. Thus, the amplitude of the shock waves 30 impinging upon the upper skin 10 tends to be reduced and consequently the pressure experienced by the upper skin 10 tends to be diminished by the presence of the first inner tank wall 18a. The assemblies 18a, 18b advantageously tend to decouple the fluid from walls of the fuel tank 16.

The inner tank walls 18a, 18b tend to disrupt the shockwaves 30 travelling through the fluid in the fuel tank 16 and thereby tend to insulate the upper and lower skins 10, 12 at least to some extent. Thus, pressures resulting from the shock waves 30 exerted on the walls of the fuel tank 16 tend to be lower than the shock wave pressures experienced in conventional fuel tanks. Thus, the likelihood of damage to the walls of the fuels tank 16 (e.g. decoupling of the external skin 10, 12 from the spars 6 or ribs 8) tends to be reduced.

In this example, as the projectile 24 passes through the fluid in the fuel tank 16, a cavitation "wake" may form behind the projectile 24, i.e. a region of low pressure (e.g. a vapour or a vacuum) may form in the wake of the projectile 24. This causes a fluid displacement and an increase in the pressure of the fluid in the fuel tank 16. Due to the passage of the projectile 24 through the fuel tank 16 being retarded at least to some degree by the second inner tank wall 18b, the increased fluid pressure resulting from cavitation caused by the projectile 24 tends to be decreased compared to conventional systems. Thus, pressures resulting from cavitation exerted on the walls of the fuel tank 16 tend to be lower than in conventional systems. Thus, the likelihood of damage to the walls of the fuels tank 16 (e.g. decoupling of the external skin 10, 12 from the spars 6 or ribs 8) tends to be reduced.

Additionally, the increased pressure resulting from cavitation caused by the projectile 24 tends to be absorbed by the hydrodynamic ram reducing assembly at least to some extent. In particular, the increased pressure in the fluid tends to cause the inner tank walls 18a, 18b to be deflected and accelerated at least to some extent, e.g., the first inner tank wall 18a may be moved in the direction indicated in FIG. 3 by solid arrows and the reference numerals 32 while the second inner tank wall 18b may be moved in the direction indicated in FIG. 3 by solid arrows and the reference numerals 34. Energy tends to be used to deflect and accelerate the inner tank walls 18a, 18b in this way, thereby reducing the energy transferred to outer walls of the fuel tank 16.

Additionally, were the projectile 24 to continue through the cavity 14 and impact with the first inner tank wall 18a, the first inner tank wall 18a would tend to cause further retardation of the projectile 24, thereby further reducing impact energy and reducing the force experienced by at least the upper skin 10.

An advantage provided by the above described assembly is that hydrodynamic ram damage to a fuel tank caused by an object impacting with an external surface of the fuel tank tends to be reduced or eliminated. Hydrodynamic pressures and their associated structural responses tend to be reduced or eliminated. Thus, the likelihood of catastrophic failure of the fuel tank and corresponding aircraft loss tends to be reduced or eliminated.

The above described assembly advantageously tends to be relative easy and cheap to manufacture.

The above described assembly tends to be relatively easy to retrofit to existing aircraft fuel tanks.

The above described assembly tends to provide protection against hydrodynamic ram damage whilst occupying a relatively small amount of the fuel tank's capacity.

In the above embodiments, the hydrodynamic ram reducing assembly is implemented in an aircraft wing fuel tank. However, in other embodiments, the assembly is used in a different type of container for containing fluid. In some embodiment, one or more walls of the container may be made of a different material to that described above.

In the above embodiments, the inner tank walls are coupled to the upper and lower aircraft skins. However, in other embodiments an inner tank wall may be coupled to a different surface of the fuel tank instead of or in addition to one or both of the upper and lower aircraft skins. For example, in some embodiments, the inner tank walls may be coupled to the ribs and/or the spars.

In the above embodiments, the inner tank walls are made of a solid material that may comprise a plurality of holes or perforations. However, in other embodiments, one or both of the inner tank walls is of a different construction. For example, an inner tank wall may comprise two spaced apart walls coupled together to define therebetween at least one chamber. This chamber may, for example, be filled with a gas or may contain a vacuum. Preferably, the two spaced part walls of such an inner tank wall are sufficiently strong to resist at least the maximum and minimum hydrostatic pressures of a liquid in the fuel tank. Also, preferably, the at least one chamber has a volume sufficient to allow a shock wave or waves in the liquid in the tank resulting from compression of the liquid by impact of a projectile on the tank and thus on the liquid to be reduced by expansion of the compressed liquid into the chamber. Also, preferably, the at least one chamber contains a material having a density sufficiently different from the density of a liquid in the tank to provide substantially total reflection within the inner tank wall of the shock wave or waves impinging on the inner tank wall thereby to reduce the hydraulic ram pressure in the liquid.

What is claimed is:

1. A liquid storage system comprising:
   an outer tank for containing a liquid, said outer tank enclosing a liquid storage space;
   an inner tank located within the outer tank and enclosing the liquid storage space; and
   spacing means associated with the outer tank and the inner tank for maintaining said tanks in a spaced apart relationship; wherein
   the spacing means are deformable such that, on application of a force to the inner tank, at least part of the inner tank moves relative to the outer tank;
   the inner tank comprises:
   a first portion comprising a first base wall and first side walls extending from the first base wall, the first side walls surrounding a first opening opposite to the first base wall; and
   a second portion comprising a second base wall and second side walls extending from the second base wall, the second side walls surrounding a second opening opposite to the second base wall; and
   the first portion and the second portion are coupled to the outer tank by respective deformable spacing means such that the first and second portions may move independently from each other.

2. The liquid storage system according to claim 1, wherein the second portion is located within the first portion such that the second opening is located at or proximate to the first base wall and such that the first opening is located at or proximate to the second base wall.

3. The liquid storage system according to claim 1, wherein the inner tank conforms substantially to the shape of the outer tank, and the spacing means maintains the tanks in a spaced apart parallel relationship so as to form an annular space between the tanks.

4. The liquid storage system according to claim 1, wherein the spacing means are elastic such that, if the inner tank moves relative to the outer tank, the inner tank is returned to its original position with respect to the outer tank.

5. The liquid storage system according to claim 1, wherein the inner tank is made of one or more materials selected from the group of materials consisting of: carbon fibre composite material, aluminum, plastic, and a material comprising aramid or para-aramid fibres.

6. The liquid storage system according to claim 1, wherein walls of the inner tank are rigid.

7. The liquid storage system according to claim 1, wherein:
   one or more walls of the inner tank comprises:
   a first wall; and
   a second wall;
   wherein the first and second walls of the inner tank are spaced apart to define therebetween at least one chamber.

8. The liquid storage system according to claim 1, wherein the inner tank is made of a permeable or semi-permeable material such that a liquid stored in the liquid storage system may flow through walls of the inner tank.

9. The liquid storage system according to claim 1, wherein the inner tank comprises one or more holes or perforations for allowing the flow of a liquid stored in the liquid storage system therethrough.

10. The liquid storage system according to claim 1, wherein a total cavity volume of the inner tank and the spacing means in the outer tank is less than or equal to 15% by volume of a volume within the outer tank.

11. The liquid storage system according to claim 1, wherein the outer tank is an aircraft fuel tank.

12. A vehicle comprising a liquid storage system for containing a liquid, the liquid storage system being in accordance with claim 1.

13. The vehicle according to claim 12, wherein the vehicle is an aircraft and the outer tank is an aircraft fuel tank.

14. The vehicle according to claim 13, wherein the outer tank is formed, at least in part, by an external skin of the aircraft.

15. A method of providing a liquid storage system, the method comprising:
   providing an outer tank for containing a liquid, said outer tank enclosing a liquid storage space;
   positioning an inner tank within the outer tank, the inner tank enclosing the liquid storage space; and
   positioning spacing means between the outer tank and the inner tank so as to maintain said tanks in a spaced apart relationship; wherein
   the spacing means are deformable such that, on application of a force to the inner tank, at least part of the inner tank moves relative to the outer tank;
   the inner tank comprises:
   a first portion comprising a first base wall and first side walls extending from the first base wall, the first side walls surrounding a first opening opposite to the first base wall; and a second portion comprising a second base wall and second side walls extending from the second base wall, the second side walls surrounding a second opening opposite to the second base wall; and the first portion and the second portion are coupled to the outer tank by respective deformable spacing means such that the first and second portions may move independently from each other.

\* \* \* \* \*